United States Patent [19]
Coveley

[11] Patent Number: 5,949,378
[45] Date of Patent: Sep. 7, 1999

[54] ROTATABLE ANTENNA FOR FINANCIAL TRANSACTION TERMINAL

[75] Inventor: Michael Coveley, Thornhill, Canada

[73] Assignee: 1273239 Ontario Limited, Canada

[21] Appl. No.: 08/821,053

[22] Filed: Mar. 20, 1997

Related U.S. Application Data

[60] Provisional application No. 60/027,780, Oct. 1, 1996.

[51] Int. Cl.[6] ................................................ H01Q 1/24
[52] U.S. Cl. ................................ 343/702; 343/906
[58] Field of Search ........................ 343/702, 906

[56] References Cited

U.S. PATENT DOCUMENTS

| | | | |
|---|---|---|---|
| 5,221,838 | 6/1993 | Gutman et al. .................. | 235/379 |
| 5,440,315 | 8/1995 | Wright et al. .................. | 343/906 |
| 5,576,720 | 11/1996 | Gorenz, Jr et al. .............. | 343/702 |
| 5,579,023 | 11/1996 | Blaese ......................... | 343/702 |

*Primary Examiner*—Don Wong
*Assistant Examiner*—Hoang Nguyen
*Attorney, Agent, or Firm*—Fitzpatrick, Cella, Harper & Scinto

[57] ABSTRACT

A financial transaction terminal includes an outer casing including a keypad to allow financial transaction data to be entered. A card reader is accommodated by the outer casing to receive and read a credit, debit or smart card. A processor is within the outer casing and is in communication with the keypad and the card reader. The processing means generates a financial transaction request in response to financial transaction data input by the keypad and read by the card reader. An RF transceiver including a rotatable antenna is in communication with the processor to transmit the financial transaction request to a remote location.

14 Claims, 10 Drawing Sheets

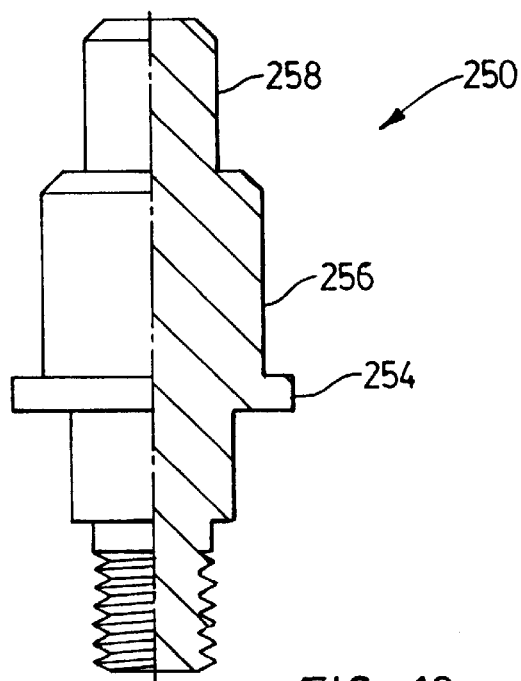
FIG. 10
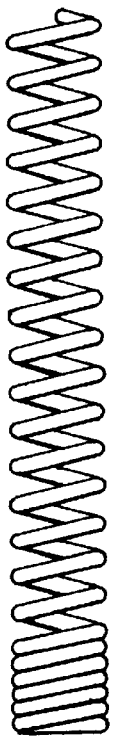
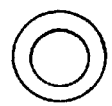
FIG. 11

ROTATABLE ANTENNA FOR FINANCIAL TRANSACTION TERMINAL

RELATED APPLICATIONS

The present application is a continuation-in-part of U.S. Provisional application issued Ser. No. 60/027,780 and filed on Oct. 1, 1996 for an invention entitled "Rotatable Antenna For A Point-Of-Sale Terminal".

FIELD OF THE INVENTION

The present invention relates to secure personal identification number entry devices such as point-of-sale financial transaction terminals and in particular to a rotatable antenna for a secure personal identification number entry device.

BACKGROUND OF THE INVENTION

Financial transaction terminals to read data stored on credit, debit and/or smart cards to complete financial transactions are known. Existing terminals such as automated banking machines (ABM's) require users to walk to a central retail platform to complete a financial transaction. More recently point-of-sale debit card terminals have been developed which allow a user to enter remotely their personal identification number (PIN) into a secure PIN entry device (SPED) together with a financial transaction request after their credit, debit or smart card has been read to access their account at a financial institution and withdraw funds directly to complete the financial transaction.

These point-of-sale debit card terminals are typically connected to a dial-up or leased telephone line and convey the entered PIN and electronic funds transfer request to the financial institution via the telephone line.

Still more recently radio frequency financial transaction terminals have been developed which can be brought to the location of a user so that a financial transaction can be completed. These radio frequency transaction terminals transmit the entered PIN, financial transaction request and read card data via an RF transceiver including an RF modem and antenna to a central network controller over an RF communications link. The central network controller in turn passes the PIN and financial transaction request to the financial institution either via a telephone line connection or RF wireless communications network. Unfortunately, the fullwave monopole antennas used in these radio frequency financial transaction terminals have been difficult to match to radio wave frequencies making them imprecise and have been subject to temperature variance effects.

It is therefore an object of the present invention to provide a novel secure personal identification number entry device such as a financial transaction terminal and a rotatable antenna for the same.

SUMMARY OF THE INVENTION

According to one aspect of the present invention there is provided a rotatable antenna comprising:

a generally L-shaped body having a first stationary arm and a second arm rotatable with respect to said first arm;

a transmission element accommodated by said second arm and in electrical communication with an electrical circuit associated with said first arm; and a coupling acting between said first and second arms to permit relative rotational movement therebetween and to inhibit separation thereof.

Preferably, the coupling means electrically connects the coil to the electrical circuit associated with the first arm. It is also preferred that the coupling means is in the form of a sleeve, opposed ends of the sleeve being accommodated by the first and second arms respectively. The sleeve includes an inturned lip at one end to abut against a formation on one of the arms and includes a projection thereon adjacent another end which is accommodated by a second complimentary formation formed in the other of the arms.

In a preferred embodiment, the first arm includes a hollow axial support, a fixed turning boss accommodated by the axial support and an axial pin connector accommodated by the turning boss, the axial pin connector retaining one end of a co-axial cable. A circumferential groove is formed in an outer surface of the turning boss and accommodates an annular formation on the sleeve to retain the sleeve to the turning boss. It is also preferred that the second arm includes a hollow body member and a pivot boss accommodated by the hollow body member. The pivot boss has a grommet formed on its outer surface which co-operates with the inturned lip on the sleeve to retain the pivot boss to the sleeve.

According to another aspect of the present invention there is provided a radio frequency financial transaction terminal comprising:

an outer casing;

input means on said outer casing to allow financial transaction data to be entered therein;

a card reader accommodated by said outer casing to receive and read a credit, debit or smart card;

a processor within said outer casing and in communication with said input means and said card reader to generate a financial transaction request in response thereto; and an RF transceiver to transmit said financial transaction request to a remote location, said RF transceiver including a rotatable antenna mounted on said outer casing.

The present invention provides advantages in that the antenna is easier to match to radio wave frequencies making it more precise than prior art antenna designs. Also, the design of the antenna makes it less subject to temperature variance effects.

BRIEF DESCRIPTION OF THE DRAWINGS

Embodiments of the present invention will now be described more fully with reference to the accompanying drawings in which:

FIG. 7b is an enlarged portion of FIG. 7a;

FIG. 9b is a top plan view of the turning base of FIG. 9a;

FIG. 10 is a side elevational view, partly in section, of a coil support forming part of the antenna of FIG. 7;

FIG. 11 is side elevation and top plan views of a coil forming part of the antenna of FIG. 7.

DETAILED DESCRIPTION OF THE PREFERRED EMBODIMENTS

Figure 1:
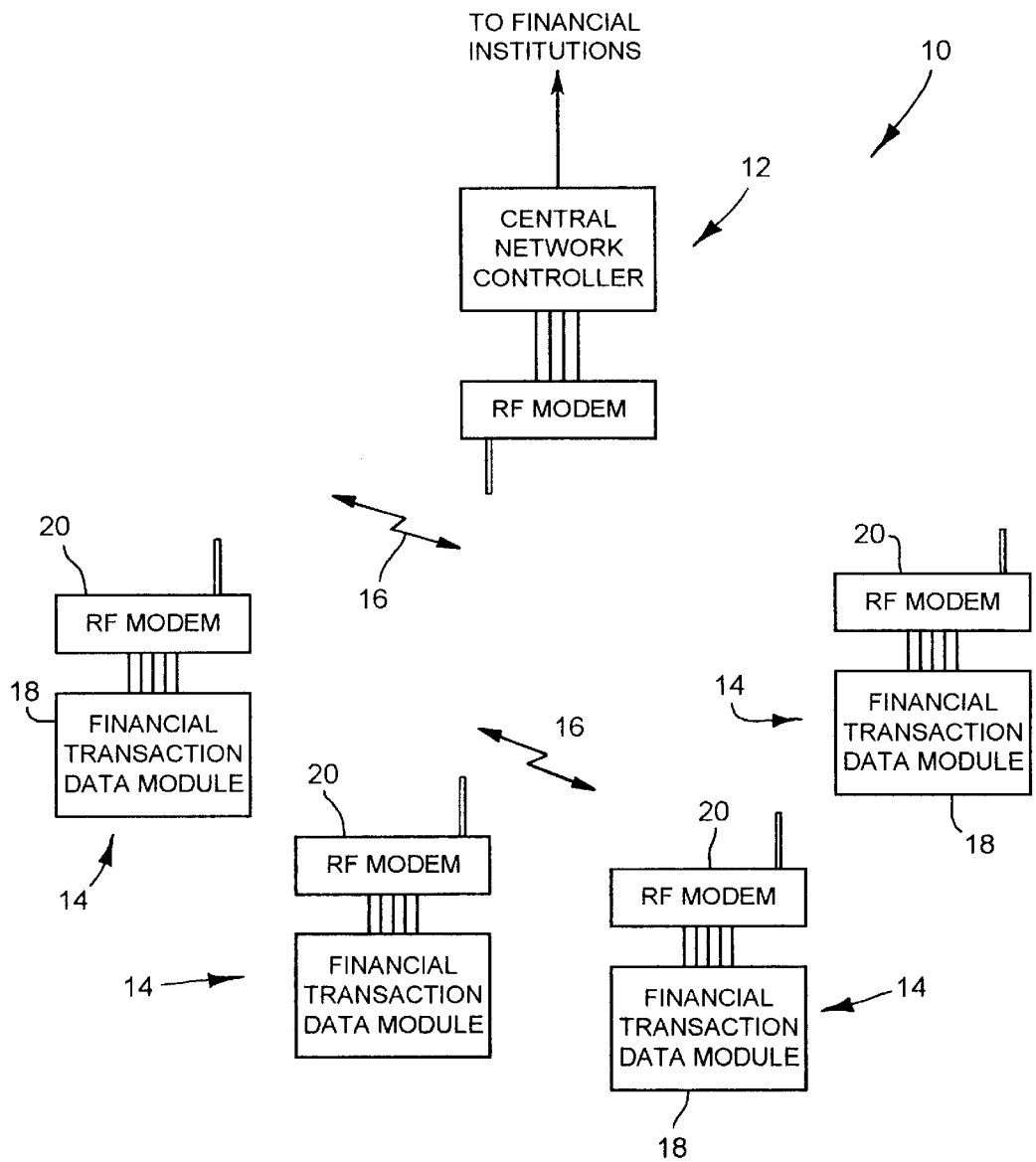
FIG. 1 is a schematic representation of a financial transaction system.

Referring now to FIG. 1, a financial transaction system is shown and is generally indicated to by reference numeral 10. Financial transaction system 10 includes a central network controller 12 and a plurality of secure personal identification number entry devices (SPEDs) in the form of portable, hand-held, radio frequency (RF) financial transaction terminals 14. The central network controller 12 and the RF financial transaction terminals 14 communicate via a wireless RF communications link 16. The central network controller 12 also communicates with host computers at financial institutions (not shown) either via hardwired network services (i.e. DATAPAC), an ISDN interface or alternatively a wireless communications network to provide real-time financial transaction processing with the host computers.

Each RF financial transaction terminal 14 includes a financial transaction data module 18 for collecting financial transaction data and an RF transceiver 20 for transmitting a financial transaction request to the central network controller and for receiving a financial transaction verification from the central network controller 12. The RF transceiver is in the form of an RF modem having an internal microcontroller unit (MCU) and a rotatable antenna as will be described.

Figure 2:
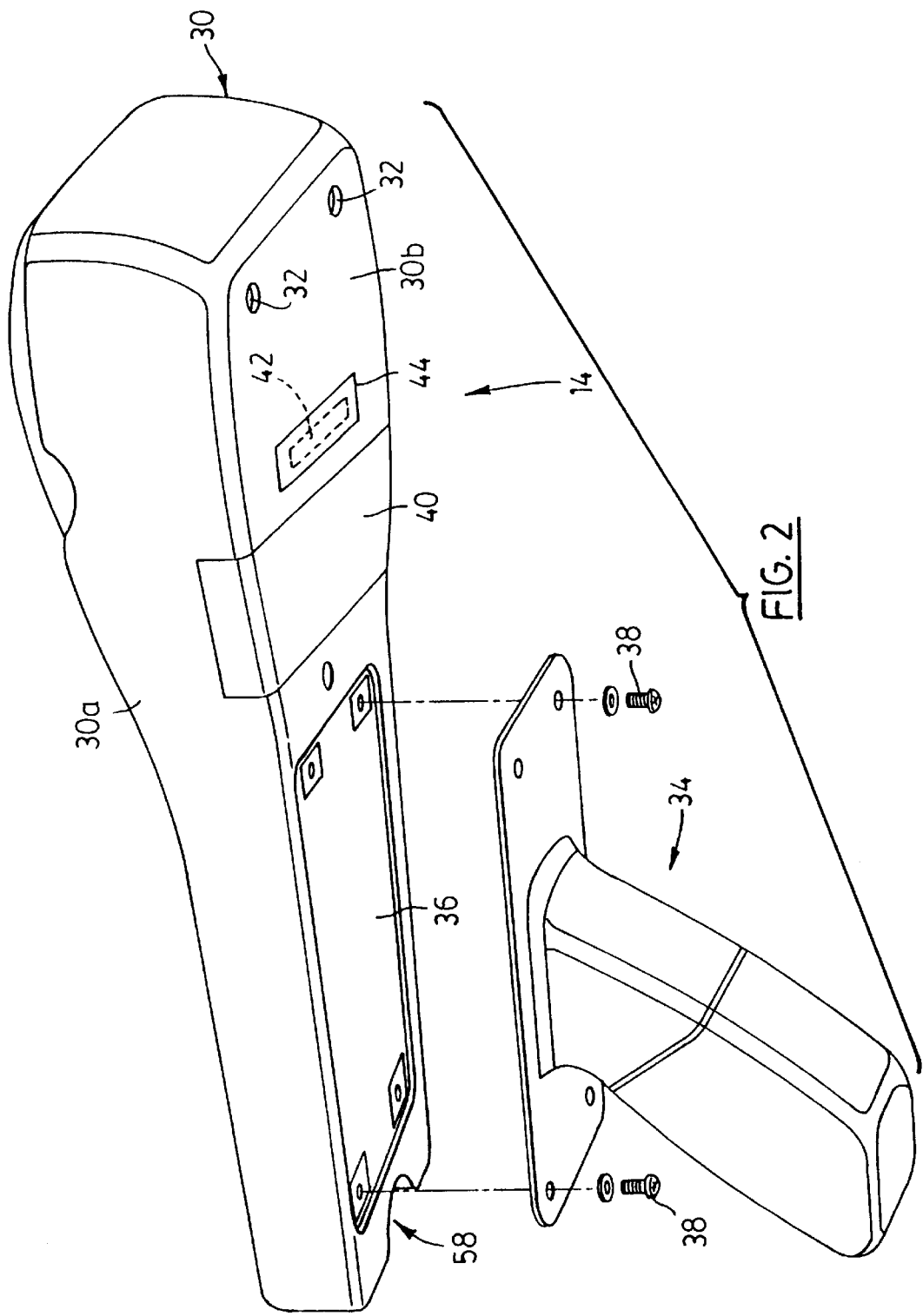
FIG. 2 is a perspective view of a portable, radio frequency financial transaction terminal forming part of the financial transaction system of FIG. 1.
Figure 3:
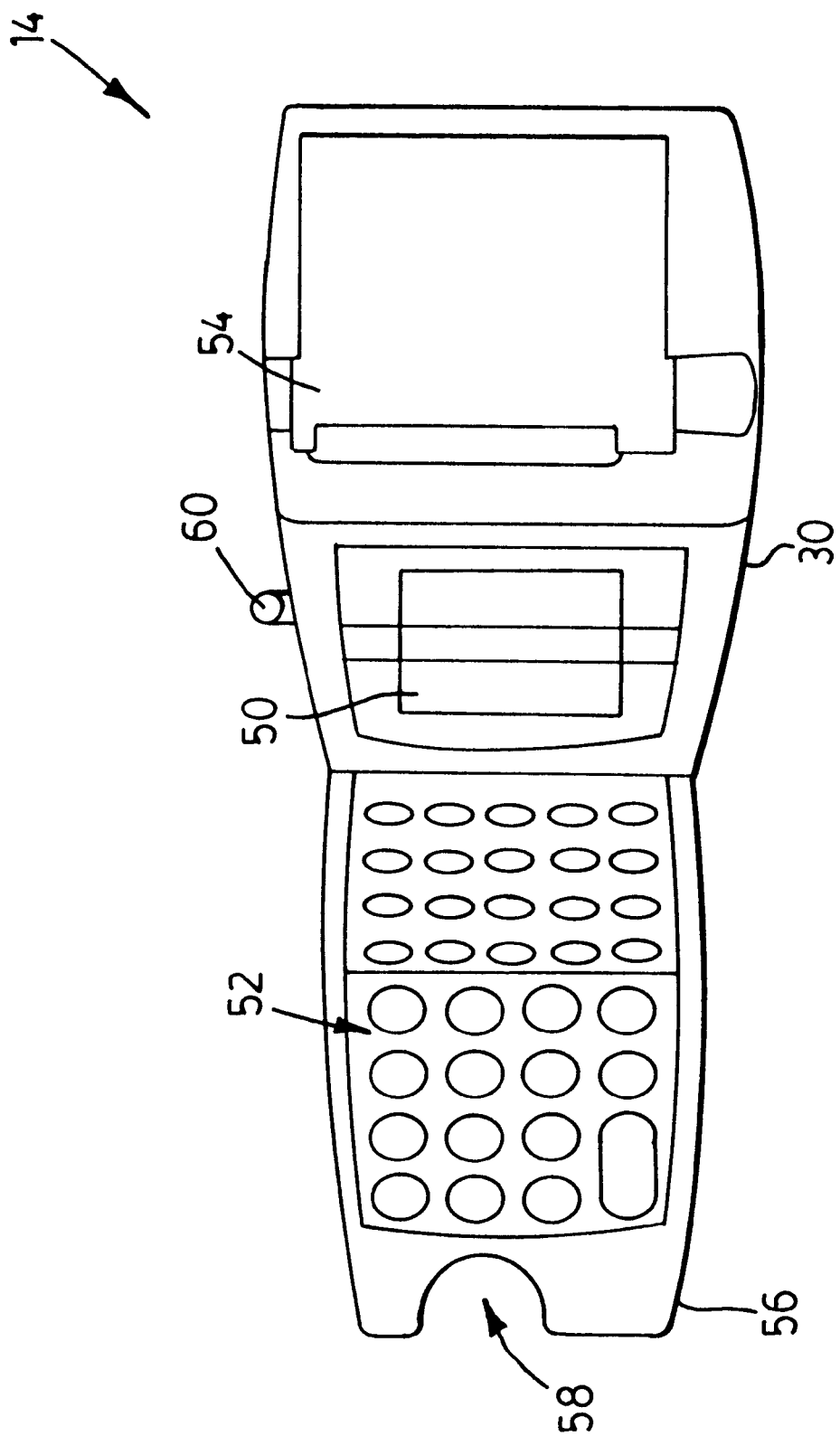
FIG. 3 is a top plan view of the radio frequency financial transaction terminal of FIG. 2.
Figure 4:
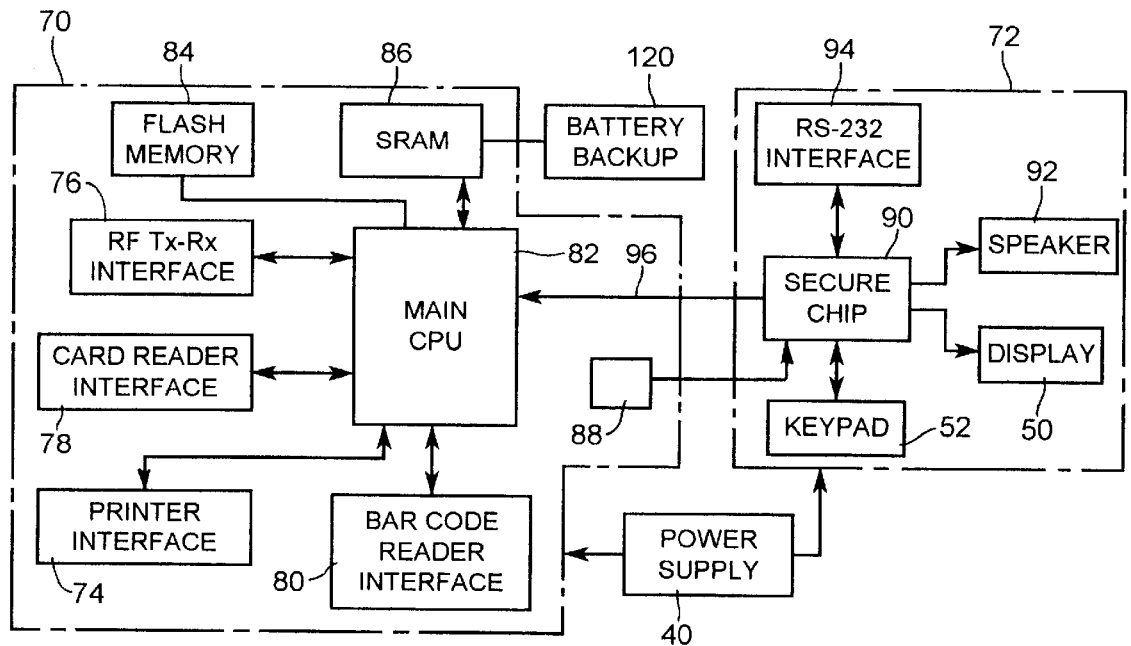
FIG. 4 is a block diagram of the radio frequency financial transaction terminal of FIG. 2.
Figure 5:
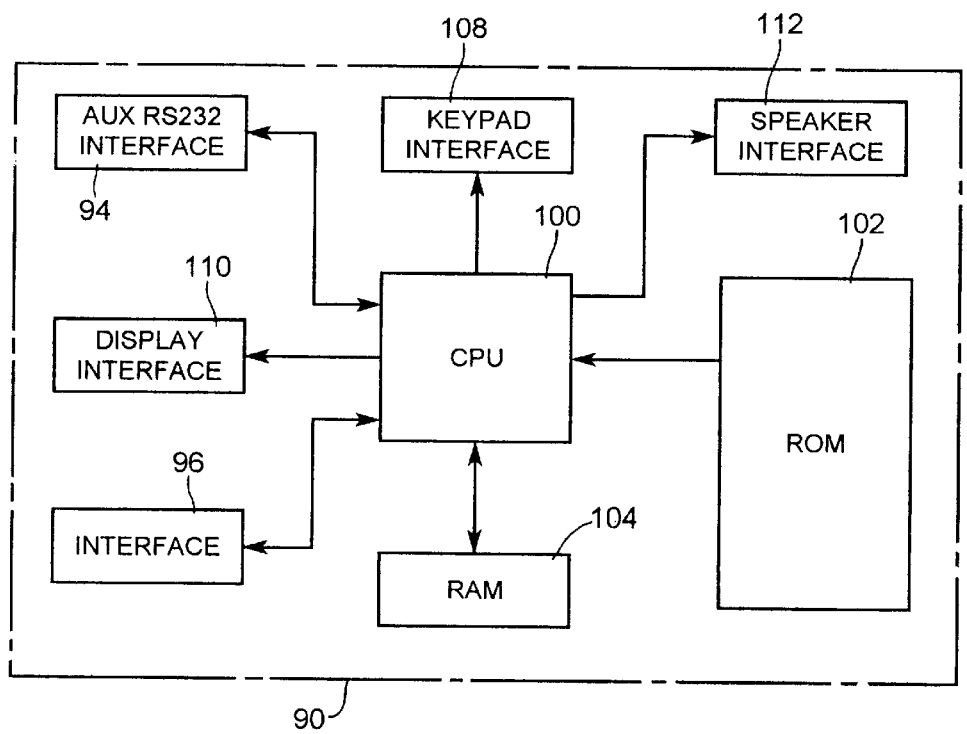
FIG. 5 is a block diagram of a secure integrated circuit device forming part of the radio frequency financial transaction terminal of FIG. 2.

Referring now to FIGS. 2 to 4, one of the RF financial transaction terminals 14 is better illustrated. The RF financial transaction terminal includes a portable, hand-held outer casing 30 which accommodates the various components of the financial transaction data module 18 and the RF transceiver 20. The outer casing 30 includes a top casing shell 30a and a bottom casing shell 30b secured together by one way screws 32 so that once assembled, access to the interior of the financial transaction terminal 14 cannot be achieved without physical evidence. A retractable, pistol-grip handle 34 is received in a recess 36 formed in the undersurface of the bottom casing shell 30b and is retained by a plurality of fasteners 38 in the form of screws. A rechargeable battery 40 is received by a pocket (not shown) in the bottom casing shell. A multi-pin universal serial port 42 to connect to an optional bar code reader, CCD scanner or other similar device (not shown) is also provided in the bottom casing shell 30b and is hidden by a sliding cover 44. An auxiliary secure RS-232 serial port 94 (see FIG. 4) is also provided on the side of the outer casing 30.

On the top casing shell 30a is an LCD display 50 and an input keypad 52 to allow financial transaction data to be entered into the financial transaction terminal 10 and displayed. Above the LCD display 50 is a printer 54 carrying a paper roll to print receipts confirming that financial transactions have been verified and processed. A card reader 56 having a card reading slot 58 therein is housed by the outer casing 30 adjacent one end thereof. The antenna 60 forming part of the RF transceiver 20 is rotatably mounted on the outer casing 30.

Within the outer casing 30 is a motherboard on which the internal components of the financial transaction terminal are mounted. In particular, the financial transaction terminal includes a main central processing unit (CPU) module 70 which communicates with a secure module 72. The functional division of the internal components into the main CPU module 70 and the secure module 72 is chosen for security.

The main CPU module 70 includes a printer interface 74 to connect to printer 54, an RF $T_x$-$R_x$ interface 76 to connect to RF modem 20, a card reader interface 78 to connect to card reader 56 and a bar code reader interface 80 connected to universal serial port 42. The main CPU module 70 is also equipped with a main CPU 82 connected to the interfaces allowing the CPU to control the operation of the printer, the RF modem, the card reader and the device connected to the universal serial port 42. The CPU 82 is also connected to flash memory 84 and static random access memory 86. The flash memory 84 stores start-up software incorporating a set of routines for initializing the RF financial transaction terminal 14 at power-up. The flash memory 84 also stores a system software loader comprising a routine for downloading system software into the static random access memory 86. Static random access memory 86 stores the system software (i.e. interrupt handlers, I/O routines, an application software loader, device drivers etc.) and an applications program area or memory space where a secure prompt table and different application programs can be downloaded (i.e. transaction verification, application specific services etc.) A photosensor 88 is also provided in the main CPU module 70 for security purposes as will be described and is connected to the secure module 72.

The secure module 72 provides cryptographic services and security measures to protect the RF financial transaction terminal 14 from software tampering that could result in debit, credit or smart card PINs or passwords from being accessed. The secure module 72 contains a microcontroller unit in the form of a physically encapsulated, one-time programmable (OTP) secure integrated circuit device 90 which controls the operation of the LCD display 50, the keypad 52 and a speaker 92 by way of display, keypad and speaker interfaces 110, 108 and 112 respectively. The secure integrated circuit device 90 also controls the auxiliary secure RS-232 serial port 94 and an interface 96 to the main CPU module 70. Auxiliary secure RS-232 serial port allows updates to data and software used by the financial transaction terminal 14 to be downloaded. The main CPU module 70 and the secure module 72 receive power from the on-board rechargeable battery 40 in a conventional manner.

The secure integrated circuit device 90 includes a CPU 100, read only memory 102 and random access memory 104. The read only memory 102 stores system software for auxiliary RS-232 port control, display control, control of communications to the main CPU module 70, keypad control and speaker control functions. The random access memory 104 is used for cryptographic key and encryption algorithm storage, PIN or password storage and system software and security software working space. The secure module 72 controls the LCD display 50 in a split-screen fashion dividing the LCD display into unsecured and secure display areas. The information displayed in the secure display area is controlled solely by the secure module 72 while the information displayed in the unsecured display area is controlled by the secure module in conjunction with the main CPU module 70.

A battery backup 120 is provided to protect against inadvertent power loss and consequent loss of data stored in the static random access memory 86 and random access memory 104 in which the cryptographic keys and encryption algorithms are stored. Read only memory 104 is designed so as to prevent unauthorized reading of its contents. In addition, since the photosensor 88 is within the outer casing 30, it is typically isolated from light. However, if the integrity of the outer casing 30 is compromised and the interior of the casing is exposed to light, the photosensor 88 triggers the secure integrated circuit device 90 clears the cryptographic keys and encryption algorithms stored in the random access memory 104 to inhibit an intruder from acquiring the cryptographic keys and encryption algorithms.

Figure 6:
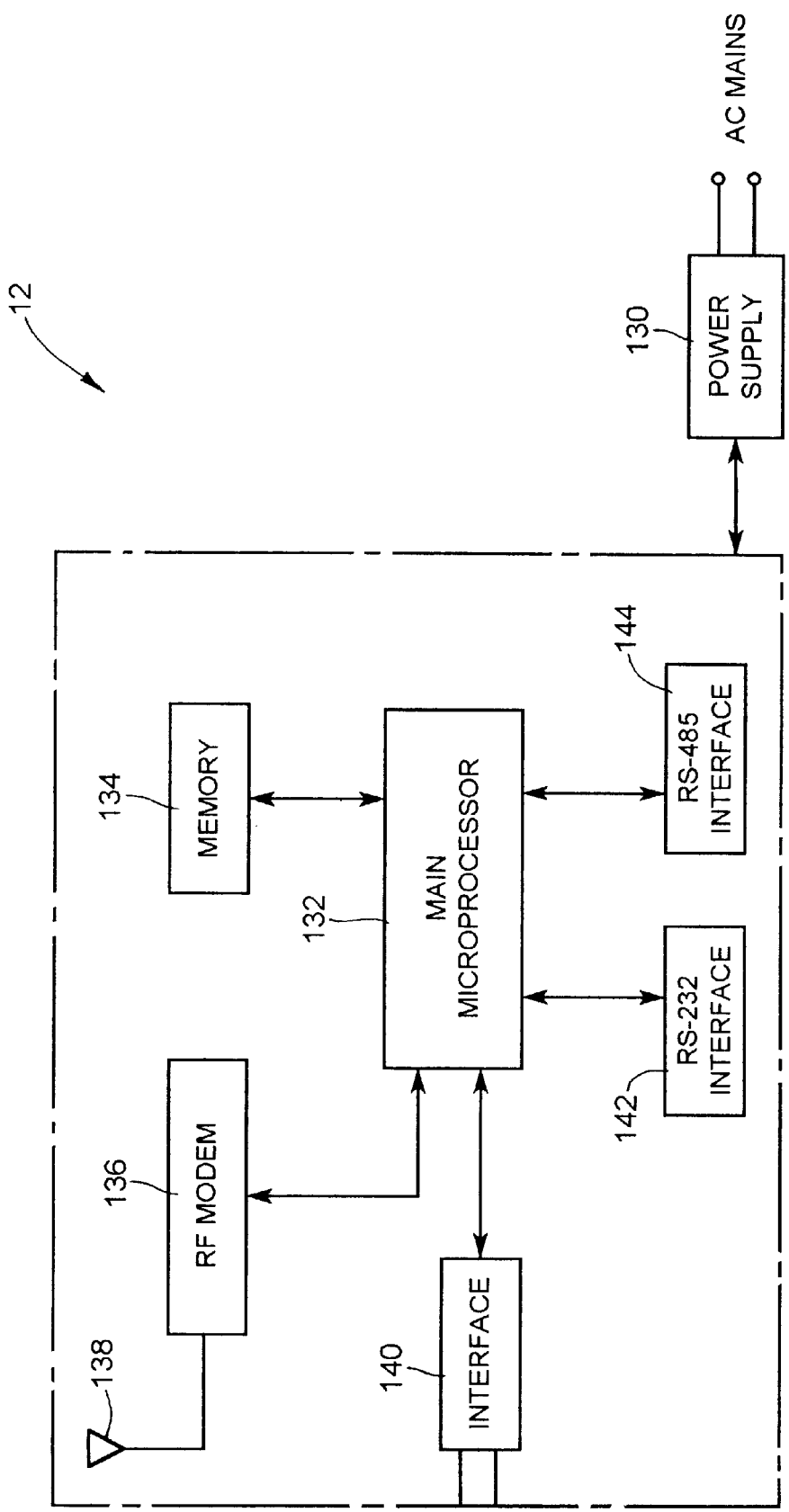
FIG. 6 is a block diagram of a central network controller forming part of the financial transaction system of FIG. 1.
Figure 7A:
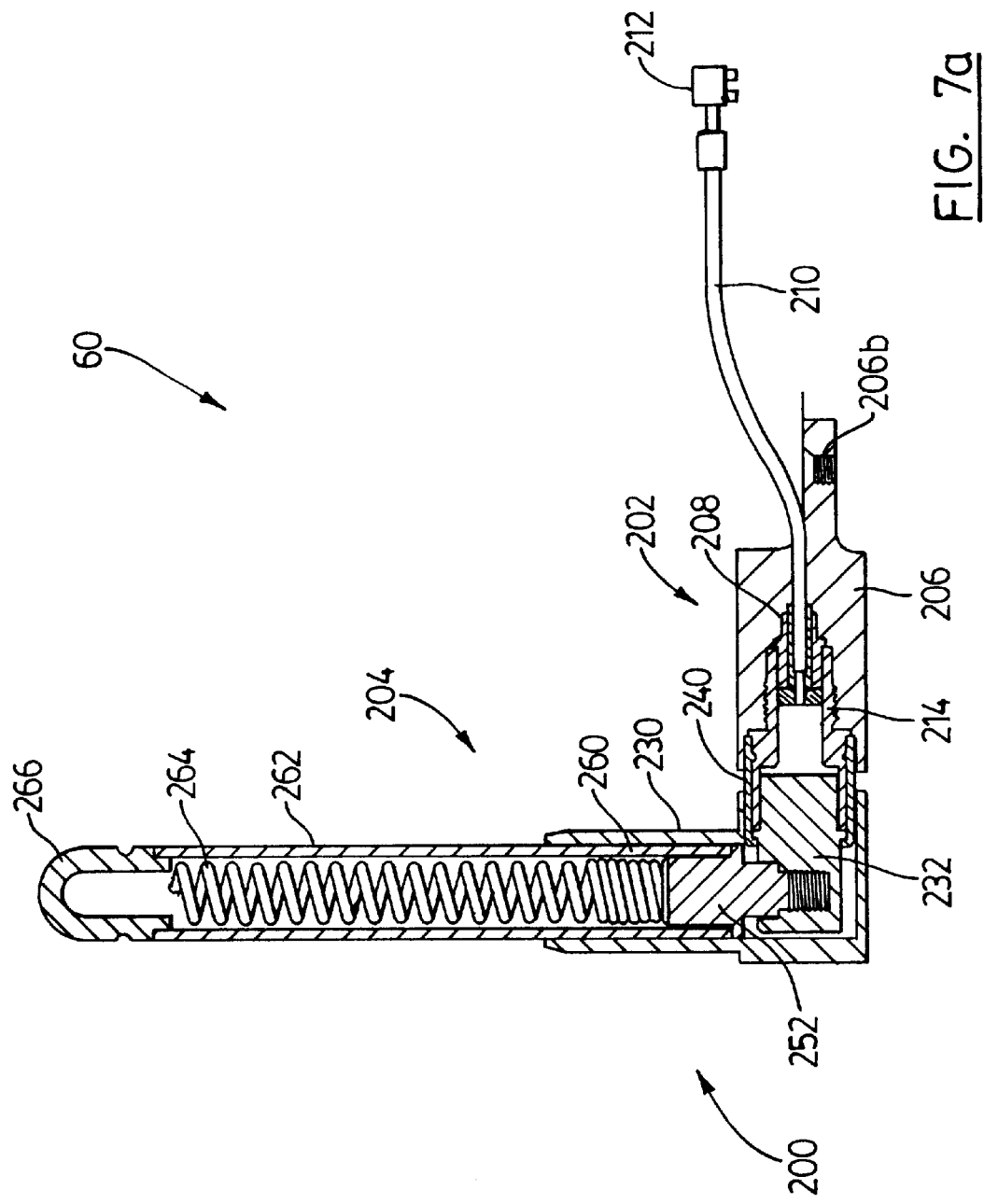
FIG. 7a is a cross-sectional view of a rotatable antenna forming part of the radio frequency financial transaction terminal of FIG. 2.
Figure 7B:
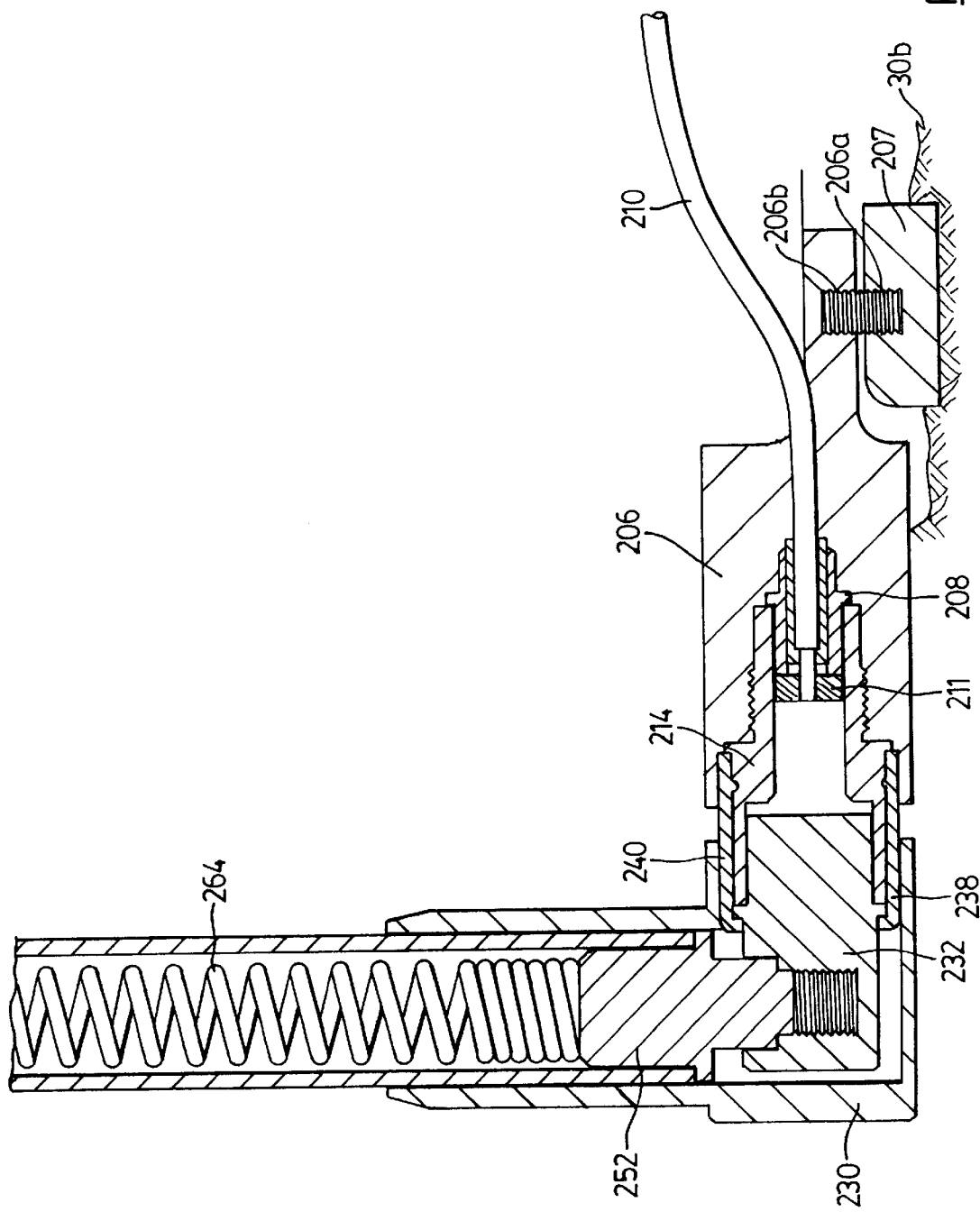
Figure 8:
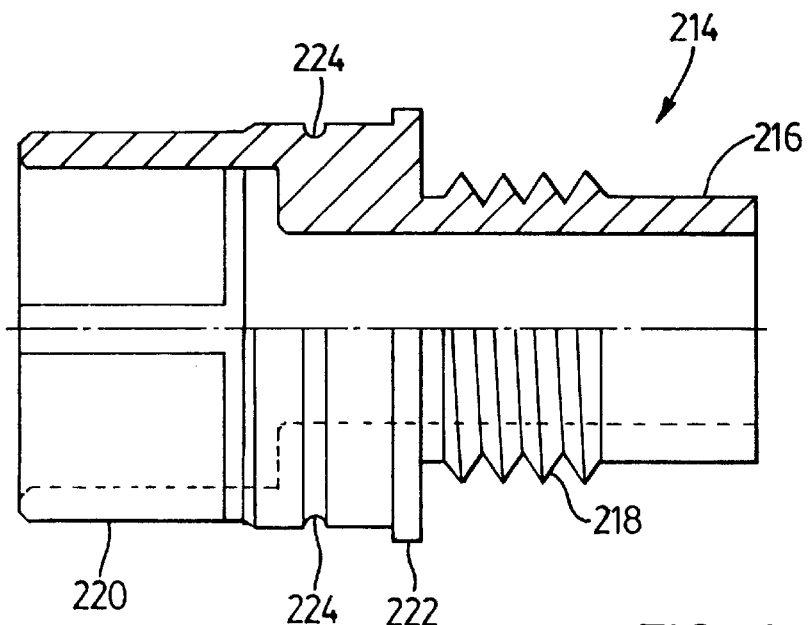
FIG. 8 is a side elevational view, partly in section, of a turning base forming part of the antenna of FIG. 7.
Figure 9A:
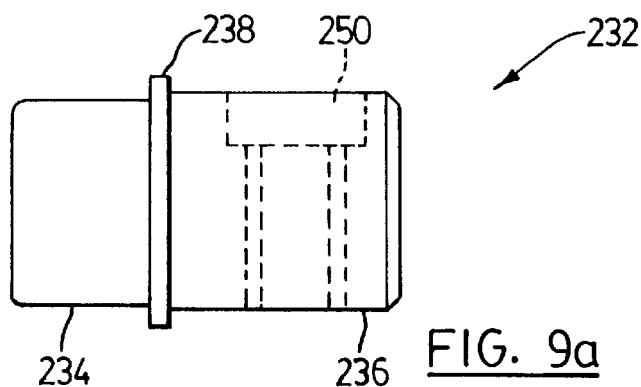
FIG. 9a is a side elevational view of another turning base forming part of the antenna of FIG. 7.
Figure 9B:
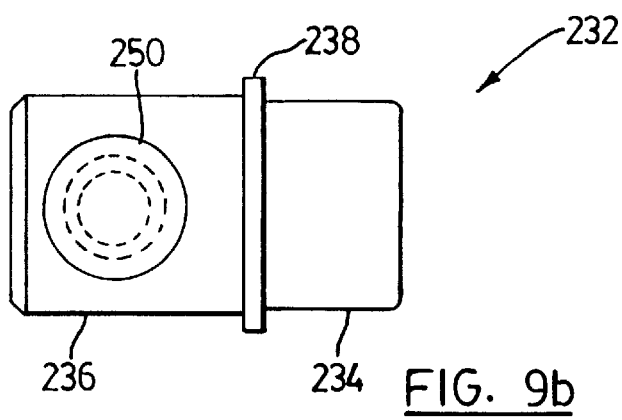

Referring now to FIG. 6, the central network controller 12 is better illustrated. The central network controller in this embodiment is connected to a dial-up or leased-line telephone line and is powered by a power supply connected to AC mains. The central network controller includes a CPU motherboard with a main microprocessor 132 and associated memory 134. The main microprocessor 132 is connected to an RF transceiver including an RF modem 136 and an antenna 138 for establishing the RF communications link 16 with the various financial transaction terminals 14. A network interface 140 is provided with DATAPAC 3101 and 3201 surface or other similar interfaces. An ISDN interface board may also be provided. A serial RS-232 interface 142 is included in the central network controller 12 to allow updates to data and software used by the financial transaction terminals 14 and central network controller 12 to be downloaded. A serial RS-485 interface 144 is also provided for optional connection of the central network controller 12 to a retailer's existing point-of-sale platforms.

Referring now to FIGS. 7a to 11, the antenna 60 is better illustrated. As can be seen, the antenna includes a generally L-shaped body 200 having one arm 202 fixed to and extending outwardly from the outer casing 30 and a second arm 204 rotatable with respect to arm 202 and generally forming a right angle therewith. Arm 202 includes a tubular axial support 206 fixedly mounted within the financial transaction terminal 14 by way of a screw 206a that passes through a bore 206b in the axial support and engages a metallic insert 207 on the bottom casing shell 30b. The other end of the axial support 206 extends through an opening in the outer casing. Within the axial support 206 is an axial pin connector 208 which receives one end of a co-axial cable 210. The other end of the co-axial cable 210 terminates at a connector 212. Connector 212 physically and electrically connects the co-axial cable to the RF modem 20. A tubular metal turning boss 214 (best seen in FIG. 8) is also accommodated by the axial support 206. The conductor within the co-axial cable 210 is electrically coupled to the turning boss 214 by way of a solder nipple 211 at the end of the co-axial cable.

The turning boss 214 includes a small diameter cylindrical portion 216 which accommodates the pin connector 208 and a larger diameter cylindrical portion 220 extending beyond the axial support 206. The cylindrical portion 216 has a threaded section 218 on its outer surface for engaging threads within the axial support 206 to secure the turning boss 214 to the axial support 206. A grommet 222 is formed on the outer surface of the turning boss 214 at the junction between the cylindrical portions 216 and 220. A circumferential groove 224 is formed in the outer surface of the cylindrical portion 220 and is spaced slightly from the grommet 222.

Arm 204 includes a hollow L-shaped body 230. The body 230 accommodates a metal pivot boss 232 having different diameter cylindrical portions 234 and 236 separated by a grommet 238 (see FIGS. 9a and 9b). Cylindrical portion 234 is surrounded by the cylindrical portion 220 of turning boss 214 and is rotatable therein. A sleeve 240 surrounds the cylindrical portions 220 and 234. Sleeve 240 has an inturned lip 242 at one end which engages the grommet 238. The other end of the sleeve abuts the grommet 222. An annular projection 244 is formed on the inner surface of the sleeve 240 and is accommodated by the groove 224 to secure arm 204 to arm 206.

The cylindrical portion 236 has a counterbore 250 formed therein. The smaller diameter portion of the counterbore is threaded and engages threads on a metal coil supporting shank 252 (see FIG. 10). The shank 252 has an annular ring 254 thereon which contacts the interior surface of the base 230. Above the ring 254 are two cylindrical portions 256 and 258 of different diameters. The space 260 between the larger diameter cylindrical portion 256 and the base 230 accommodates a press-fitted cylindrical coil housing 262. The smaller diameter cylindrical portion 258 is surrounded by one end of a metal helical, compound wound, halfwave coil 264 best shown in FIG. 11. A paraboloid cap 266 is press-fitted on the open top of the coil housing 262 to enclose the coil 264.

Since the pivot boss 232 is rotatable within the turning boss 214, the arm 204 can be rotated with respect to arm 202. This allows the arm 204 to be oriented at the desired angle when the financial transaction terminal 14 is in use and rotated to a retracted position running alongside the outer casing 30 when the financial transaction terminal 14 is not in use. The engagement between the annular projection 244 on the sleeve 240 and the groove 224 in the turning boss 214 together with the co-operation between the inturned lip 242 on the sleeve 240 and the grommet 238 on the pivot boss 232 inhibit axial separation of the turning and pivot bosses 214 and 232 thereby retaining the arms 202 and 204 together. The turning and pivot bosses 214 and 232 do however frictionally engage so that the antenna 60 remains stationary once positioned at the desired orientation. Although not shown, detents can be provided on the turning and pivot bosses to limit the extent of rotation of the antenna. For example, in the case of a local area network environment, detents can be provided to limit rotation of the antenna to approximately 220°. In the case of a wide area network environment, detents are typically not used allowing the antenna to be rotated throughout 360°.

In operation, financial transactions are carried out by bringing one of the financial transaction terminals 14 to the location of a user. Transaction data is entered into the financial transaction terminal via the input keypad 52 and displayed via LCD display 50. The user's debit, credit or smart card is read by the card reader 56 in the financial transaction terminal in the presence of the user. The user is required to enter a PIN or password via the keypad 52. The financial transaction terminal 14 does not display the entered PIN or password data or the data read by card reader 56. The secure integrated circuit device 90 encrypts the PIN or password data to inhibit the data from being accessed by unauthorized parties. Once encrypted, a financial transaction request is generated by the financial transaction terminal 14 which includes the financial transaction data i.e., the entered transaction data, read card data and encrypted PIN or password). The financial transaction request is then transmitted to the central network controller 12 by the RF modem 20 via the antenna 60 over the RF communications link 16.

The financial transaction request generated by the financial transaction terminal propagates through the conductive components of the antenna 60 and is broadcasted. The compound wound coil 264 results in stronger electric field vectors making the antenna 60 easier to match to radio wave frequencies and making the antenna more precise. Also, the design of the antenna makes it less subject to temperature variance effects.

The central network controller 12 in turn conveys the financial transaction request to the financial institution so that the financial transaction can be verified and processed. Once verified processed, the financial institution conveys verification data to the central network controller 12. The central network controller in turn transmits the verification data to the financial transaction terminal 14 to inform the user that the financial transaction has been verified and processed. The verification data is received by the RF modem 20 via the antenna 60 and is conveyed to the financial transaction data module 18. The financial transaction terminal in turn prints a receipt confirming that the transaction has been verified and processed. Further details of the operation of the financial transaction terminals and central network controller are described in Applicant's co-pending PCT application Ser. No. PCT/CA96/00104 filed on Feb. 22, 1996 and designating the United States, the content of which is incorporated herein by reference.

Figure 12:
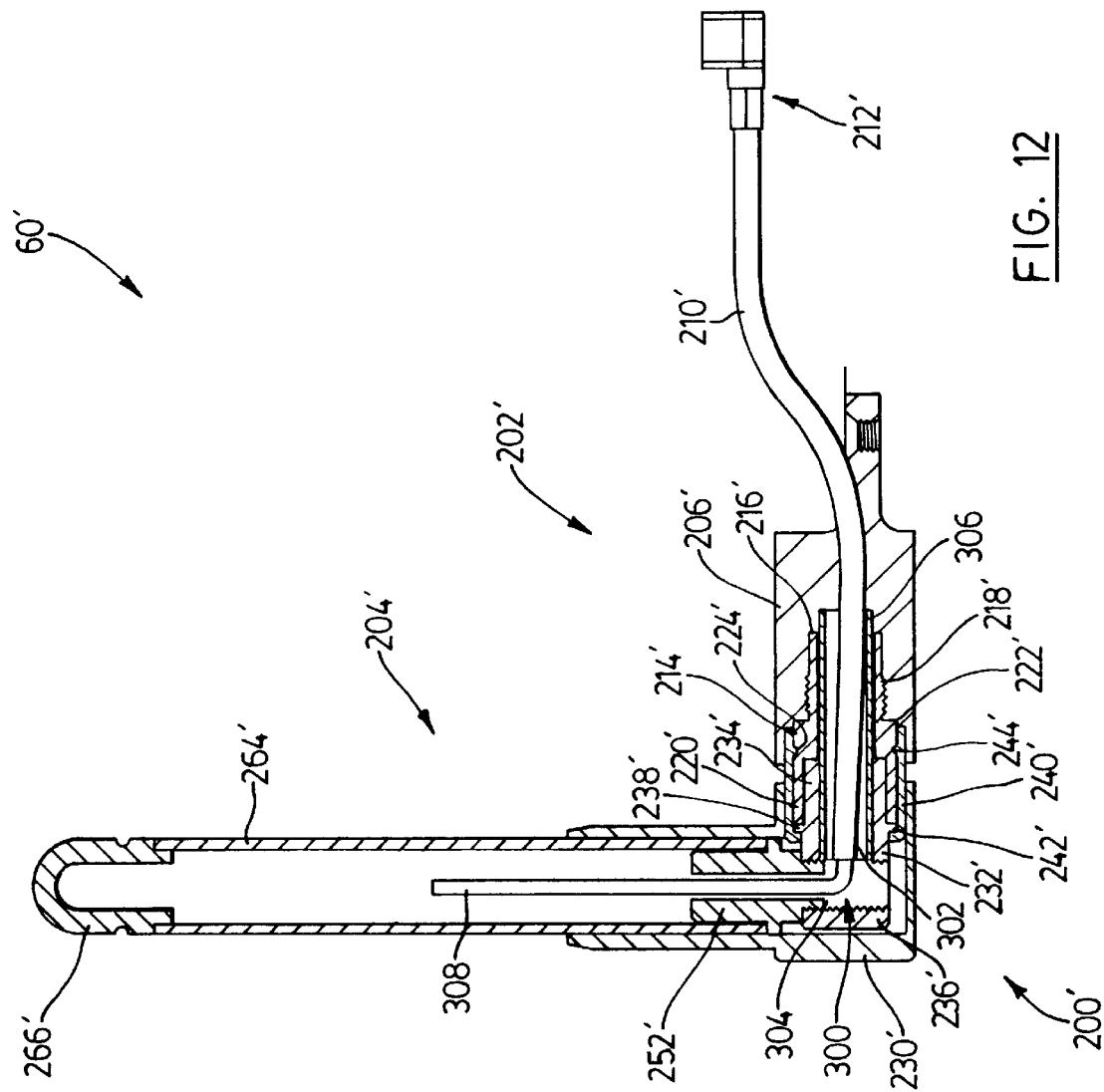
FIG. 12 is a cross-sectional view of another embodiment of a rotatable antenna for a radio frequency financial transaction terminal.

Referring now to FIG. 12 another embodiment of a rotatable antenna is shown and is generally indicated to by reference numeral 60'. In this embodiment, like reference numerals will be used to indicate like components of the previous embodiment with a "'" added for clarity. Antenna 60' is designed for higher frequency applications but its design is similar to that of the previous embodiment.

As can be seen, the antenna 60' includes a generally L-shaped body 200' having one arm 202' fixed to and extending outwardly from the outer casing 30' and a second arm 204' rotatable with respect to arm 202' and generally forming a right angle therewith. Arm 202' includes a hollow axial support 206' fixedly mounted on the bottom casing shell (not shown) in the same manner as in the previous embodiment. The other end of the axial support 206' extends through an opening in the outer casing.

Within the axial support 206' is a tubular metal turning boss 214'.

The turning boss 214' includes a small diameter cylindrical portion 216' having a threaded section 218' on its outer surface to engage threads within the axial support 206' to secure the turning boss 214' to the axial support 206'. The turning boss 214' also includes a larger diameter cylindrical portion 220' which extends beyond the axial support 206'. A grommet 222' is formed on the outer surface of the turning boss 214' adjacent the junction between the cylindrical portions 216' and 220'. A circumferential groove 224' is formed in the outer surface of the cylindrical portion 220' and is spaced slightly from the grommet 222'.

Arm 204' includes a tubular L-shaped body 230'. The body 230' accommodates a metal pivot boss 232' having different diameter cylindrical portions 234' and 236' separated by a grommet 238'. Cylindrical portion 234' is surrounded by the cylindrical portion 220' of turning boss 214' and is rotatable therein. A sleeve 240' surrounds the cylindrical portions 220' and 234'. Sleeve 240' has an inturned lip 242' at one end which engages the grommet 238'. The other end of the sleeve abuts the grommet 222'. An annular projection 244' is formed on the inner surface of the sleeve 240' and is accommodated by the groove 224' to secure arm 204' to arm 206'.

The pivot boss 232' has a T-shaped bore 300 provided therein. One arm 302 of the bore is aligned with the central longitudinal axis of the turning boss 214'. The other arm 304 of the bore 300 is threaded. A brass tube 306 extends through the turning boss 214' and the pivot boss 232'. One end of a co-axial cable 210' is received by the brass tube 306 and the other end of the co-axial cable 210' terminates at a connector 212' which physically and electrically connects the co-axial cable to the RF modem. A shank 252' has a threaded end which engages the threaded arm 304 of bore 300. An annulus 254' is provided on the outer surface of the shank 252' and contacts the interior surface of the body 230'. The space 260' between the shank 252' and the body 230' above the annulus 254' accommodates a press-fitted cylindrical, tubular housing 262'. A paraboloid cap 266' is press-fitted on the open top of the housing 262'. The conductor 308 of the co-axial cable 210' extends beyond the brass tube 306 and turns upwardly into the arm 304 of bore 300. The conductor 308 extends through the shank 252' and into the housing 262' before terminating intermediate the ends of the housing 262'.

Although particular embodiments of the present invention have been described, those of skill in the art will appreciate that variations and modifications may be made thereto without departing from the spirit and scope thereof as defined by the appended claims.

I claim:

1. A rotatable antenna comprising:
   a generally L-shaped body having a first stationary arm and a second arm rotatable with respect to said first arm and arranged generally at a right angle thereto;
   a transmission element accommodated by said second arm and in electrical communication with an electrical circuit associated with said first arm; and
   a coupling acting between said first and second arms to permit relative rotational movement therebetween and to inhibit separation thereof, said coupling including a sleeve, opposite ends of said sleeve being accommodated by said first and second arms respectively, said sleeve having an inturned lip at one end thereof to abut against a first formation on one of said first and second arms, said sleeve having a projection adjacent another end thereof accommodated by a second formation formed in the other of said first and second arms.

2. A rotatable antenna as defined in claim 1 wherein said first formation is in the form of an annular grommet.

3. A rotatable antenna as defined in claim 2 wherein said projection is an annular ring on said sleeve and wherein said second formation is a circumferential groove.

4. A rotatable antenna as defined in claim 3 wherein said transmission element is in the form of a helical coil and wherein said coupling electrically connects said coil to said electrical circuit.

5. A rotatable antenna as defined in claim 4 wherein said first arm includes a tubular axial support, a tubular turning boss accommodated by said axial support and a pin connector accommodated by said turning boss, said pin connector retaining one end of a co-axial cable within said turning boss, said circumferential groove being formed in an outer surface of said turning boss, a portion of said sleeve being accommodated between said axial support and said turning boss.

6. A rotatable antenna as defined in claim 5 wherein said second arm includes a tubular body member and a pivot boss accommodated by said hollow body member, said pivot boss having said grommet formed on an outer surface thereof and being housed within said tubular body member.

7. A rotatable antenna as defined in claim 6 wherein said second arm further includes a coil supporting shank coupled to said pivot boss and supporting said coil.

8. A radio frequency financial transaction terminal comprising:

an outer casing:

input means on said outer casing to allow financial transaction data to be entered therein;

a card reader accommodated by said outer casing to receive and read a credit, debit or smart card;

a processor within said outer casing and in communication with said input means and said card reader to generate a financial transaction request in response thereto; and an RF transceiver to transmit said financial transaction request to a remote location, said RF transceiver including a rotatable antenna mounted on said outer casing wherein, said antenna includes a generally L-shaped body having a first stationary arm mounted on said outer casing and a second arm rotatable with respect to said first arm and arranged generally at a right angle thereto; a transmission element accommodated by said second arm and being in electrical communication with an electrical circuit associated with said first arm, said electrical circuit being electrically connected to said processor; and a coupling acting between first and second arms to permit relative rotational movement therebetween and to inhibit separation thereof, said coupling including a sleeve, opposite ends of said sleeve being accommodated by said first and second arms respectively, said sleeve having an inturned lip at one end thereof to abut a first formation on one of said first and second arms, said sleeve having a projection adjacent another end thereof accommodated by a second formation formed in the other of said first and second arms.

9. A financial transaction terminal as defined in claim 8 wherein said coupling electrically connects said transmission element to said electrical circuit.

10. A financial transaction terminal as defined in claim 9 wherein said first formation is in the form of an annular grommet.

11. A financial transaction terminal as defined in claim 10 wherein said projection is an annular ring on said sleeve and wherein said second formation is a circumferential groove.

12. A financial transaction terminal as defined in claim 11 wherein said first arm includes a tubular axial support, a tubular turning boss accommodated by said axial support and a pin connector accommodated by said turning boss, said pin connector retaining one end of a co-axial cable within said turning boss, said circumferential groove being formed in an outer surface of said turning boss, a portion of said sleeve being accommodated between said axial support and said turning boss.

13. A financial transaction terminal as defined in claim 12 wherein said second arm includes a hollow body member and a pivot boss accommodated by said tubular body member, said pivot boss having said grommet formed on an outer surface thereof and being housed within said hollow body member.

14. A financial transaction terminal as defined in claim 13 wherein said second arm further includes a coil supporting shank coupled to said pivot boss and supporting said coil.

* * * * *